J. M. Culver.
Garden Cultivator.
Nº 89,634. Patented May 4, 1869.
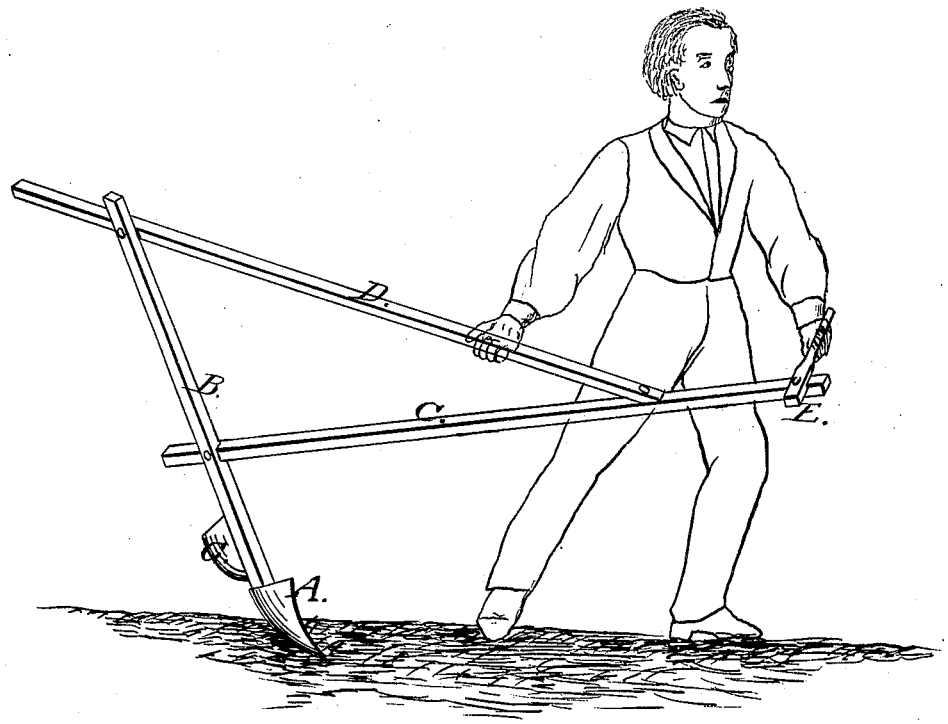
Witnesses:
G. Raettig
Wm A. Morgan
Inventor:
J. M. Culver,
per Mumm & Co
Attorneys.

United States Patent Office.

J. M. CULVER, OF GILBERTSVILLE, IOWA.

Letters Patent No. 89,634, dated May 4, 1869.

IMPROVEMENT IN GARDEN-CULTIVATORS.

The Schedule referred to in these Letters Patent and making part of the same.

*To all whom it may concern:*

Be it known that I, J. M. CULVER, of Gilbertsville, in the county of Black Hawk, and State of Iowa, have invented a new and useful Improvement in Cultivators; and I do hereby declare that the following is a full, clear, and exact description thereof, which will enable others skilled in the art to make and use the same, reference being had to the accompanying drawing, forming part of this specification.

This invention relates to improvements in cultivators, the object of which is to provide a light hand-implement for garden use.

The drawing represents a side elevation of my improved cultivator.

I secure a common shovel-plow or cultivator to the end of a stock, B, in any suitable manner, and connect the handle C thereto a short distance above the said plow, and provide a brace, D, connecting the top of the stock B (which is elevated considerably above the point of junction with the handle) with the handle near the front end.

This arrangement, besides strengthening the connection of the handle, affords a better means of applying the hands, both for drawing and balancing the plow.

The front end of the handle may be provided with a cross-bar, E, and the stock B is weighted at G, both for the purpose of causing the plow to take into the ground, and for ballasting the same.

This arrangement provides a very cheap and serviceable implement, which may be used to greater advantage than the common garden-hoeing and raking implement.

Having thus described my invention,

I claim as new, and desire to secure by Letters Patent—

The improved cultivator herein described, when constructed and arranged as specified.

J. M. CULVER.

Witnesses:
   PETER ZETTEN,
   JOHN C. ROLOFF.